United States Patent
Zhang et al.

(10) Patent No.: US 11,704,604 B2
(45) Date of Patent: Jul. 18, 2023

(54) OPTIMIZATION METHOD, APPARATUS, COMPUTER DEVICE AND STORAGE MEDIUM FOR ENGINE MODEL

(71) Applicant: SOUTHERN UNIVERSITY OF SCIENCE AND TECHNOLOGY, Guangdong (CN)

(72) Inventors: Qingquan Zhang, Shenzhen (CN); Xin Yao, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 0 days.

(21) Appl. No.: 17/878,287

(22) Filed: Aug. 1, 2022

(65) Prior Publication Data
US 2022/0374790 A1 Nov. 24, 2022

Related U.S. Application Data

(63) Continuation of application No. PCT/CN2022/080247, filed on Mar. 10, 2022.

(30) Foreign Application Priority Data

Apr. 9, 2021 (CN) .......................... 202110384258.6

(51) Int. Cl.
*G06Q 10/04* (2023.01)
*G06F 17/11* (2006.01)

(52) U.S. Cl.
CPC ............. *G06Q 10/04* (2013.01); *G06F 17/11* (2013.01)

(58) Field of Classification Search
None
See application file for complete search history.

(56) References Cited

U.S. PATENT DOCUMENTS

| 6,523,016 B1 * | 2/2003 | Michalski | G06N 3/126 706/14 |
| 7,363,280 B2 * | 4/2008 | Jin | G06N 3/126 706/45 |

(Continued)

FOREIGN PATENT DOCUMENTS

| CN | 107122844 A | 9/2017 |
| CN | 108683189 A | 10/2018 |

(Continued)

OTHER PUBLICATIONS

International Search Report dated May 23, 2022 in corresponding International application No. PCT/CN2022/080247; 6 pages.

*Primary Examiner* — Ryan D. Coyer
(74) *Attorney, Agent, or Firm* — Maier & Maier, PLLC (57) ABSTRACT

An optimization method, apparatus, computer device and storage medium for engine model. The method includes: setting an initial population according to a predetermined number of solutions; obtaining a first output set of the initial population on the engine model; determining a first fitness value; operating selection, crossover, and mutation on the initial population according to the first fitness value to obtain an evolved population, and the initial population and the evolved population constitute a to-be-selected population; obtaining a second output set of the evolved population on the engine model; determining a second fitness value; selecting engine model parameters in the to-be-selected population to form a new population according to the second fitness value; and optimizing the engine model by using the engine model parameters in the new population if a termination condition is met.

9 Claims, 3 Drawing Sheets

(56) References Cited

U.S. PATENT DOCUMENTS

| | | | | |
|---|---|---|---|---|
| 7,398,257 B2 * | 7/2008 | Kaji | ........................ | G06F 17/11 |
| | | | | 700/173 |
| 2001/0051936 A1 * | 12/2001 | Michalewicz | ........... | G06N 5/01 |
| | | | | 706/46 |
| 2005/0143845 A1 * | 6/2005 | Kaji | ...................... | G06N 3/126 |
| | | | | 700/28 |
| 2012/0005137 A1 * | 1/2012 | Cantin | ................... | G06N 3/126 |
| | | | | 706/13 |
| 2018/0357610 A1 * | 12/2018 | Liu | ................... | G06Q 10/1093 |

FOREIGN PATENT DOCUMENTS

| | | | |
|---|---|---|---|
| CN | 111178487 | A | 5/2020 |
| CN | 112182948 | A | 1/2021 |
| CN | 112949211 | A | 6/2021 |
| EP | 2048604 | A1 | 4/2009 |

\* cited by examiner

OPTIMIZATION METHOD, APPARATUS, COMPUTER DEVICE AND STORAGE MEDIUM FOR ENGINE MODEL

CROSS-REFERENCES TO RELATED APPLICATIONS

This application is a bypass continuation application of PCT application No. PCT/CN2022/080247 filed on Mar. 10, 2022, which claims priority to Chinese patent application No. 202110384258.6 filed on Apr. 9, 2021, the contents of each of the above application are hereby incorporated by reference.

FIELD

The present disclosure relates to the field of engine technology, in particular, to an optimization method, apparatus, computer device and storage medium for engine model.

BACKGROUND

Before the engine is officially used, the engine model is required to be designed with a certain reliability, so it needs to be able to maintain normal operation in different test states, and in each test state, it is also generally necessary to make some indicators reach expected values. Therefore, assuming that the number of test states is k, and h indicators need to be optimized in each test state, then k*h indicators need to be optimized simultaneously. However, the engine design generally involves complex mathematical models such as fluid mechanics principles, which are often non-derivable, non-convex, or non-continuous, so it is difficult to solve effectively by traditional mathematical methods in the process of optimization.

At present, the above problems are generally solved by converting an obtained multi-target problem into a single-target problem, but the conversion into single-target can easily cause conflicts among targets, i.e., it is difficult to balance the choice between a large number of benchmark dimensions, and it is likely that the overall target value needs to be reduced at the expense of the performance of some dimensions, which is difficult to apply in real life. Another option is to adopt dominance relationship-based or decomposition-based multi-target optimization methods, but often in real life, the value of k*h is large and has a relatively high dimension, so there will be a large number of non-dominated solutions, and dominance relationship-based multi-target optimization methods (such as NSGAII and SPEA2) are difficult to handle due to an over-low selection pressure, while for decomposition-based multi-target optimization methods (e.g., MOEA/D), reference point sets are required, and when the number of populations needed is large, the number of calls to the engine model which are often expensive increases, so it will be very wasteful of computation time when adopting larger populations.

SUMMARY

The present disclosure provides an optimization method, apparatus, computer device, and storage medium for engine model to achieve the solution of a high-dimensional engine parameter optimization problem while avoiding the problems of numerous non-dominated solutions and low selection pressure due to high dimensionality, as well as the dependence on reference point sets.

In a first aspect, embodiments of the present disclosure provide a method for optimizing engine model, the method comprises:

(a) setting an initial population according to a predetermined number of solutions, each element in the initial population representing a group of engine model parameters.

(b) substituting each group of engine model parameters in the initial population into the engine model to obtain a first output set of the initial population on the engine model.

(c) determining a first fitness value for each group of engine model parameters in the initial population according to the first output set.

(d) operating selection, crossover, and mutation on the initial population according to the first fitness value to obtain an evolved population; the initial population and the evolved population constituting a to-be-selected population.

(e) substituting each group of engine model parameters in the evolved population into the engine model to obtain a second output set of the evolved population on the engine model.

(f) determining a second fitness value for each group of engine model parameters in the to-be-selected population according to the first output set and the second output set.

(g) selecting engine model parameters in the to-be-selected population to form a new population according to the second fitness value, a number of the groups of engine model parameters in the new population being the predetermined number of solutions.

(h) if a termination condition is not met, updating the initial population according to the new population, as well as updating the first output set according to an output of each group of engine model parameters in the new population on the engine model, and returning to execution step (c); if the termination condition is met, optimizing the engine model by using the engine model parameters in the new population.

In a second aspect, embodiments of the present disclosure further provide an optimization apparatus for engine model, the device comprises:

an initial population setting module, configured to set an initial population according to a predetermined number of solutions, each element in the initial population representing a group of engine model parameters.

a first output set acquisition module, configured to substitute each group of engine model parameters in the initial population into the engine model to obtain a first output set of the initial population on the engine model.

a first fitness value determination module, configured to determine a first fitness value for each group of engine model parameters in the initial population according to the first output set.

A to-be-selected population acquisition module, configured to operate selection, crossover, and mutation on the initial population according to the first fitness value in order to obtain an evolved population; the initial population and the evolved population constituting a to-be-selected population.

a second output set acquisition module, configured to substitute each group of engine model parameters in the evolved population into the engine model to obtain a second output set of the evolved population on the engine model.

a second fitness value determination module, configured to determine a second fitness value for each group of engine model parameters in the to-be-selected population according to the first output set and the second output set.

a new population acquisition module, configured to select engine model parameters in the to-be-selected population to form a new population based on the second fitness value, a number of the groups of engine model parameters in the new population being the predetermined number of solutions.

output module, configured to update the initial population according to the new population if a termination condition is not met, and to update the first output set according to an output of each group of engine model parameters in the new population on the engine model, and return to the first fitness value determination module for continued execution; if the termination condition is met, then the engine model is optimized by using the engine model parameters in the new population.

In a third aspect, embodiments of the present disclosure further provide a computer apparatus, the computer apparatus comprising.

One or more processors,

A memory for storing one or more programs.

When the one or more programs are executed by the one or more processors such that the one or more processors implement the optimization method of the engine model provided by any embodiment of the present disclosure.

In a fourth aspect, embodiments of the present disclosure further provide a computer readable storage medium having a computer program stored thereon which, when executed by a processor, implements the optimization method of the engine model provided in any embodiment of the present disclosure.

The embodiments of the present disclosure provide a method for optimizing engine model. First an initial population according to a predetermined number of solutions is set, each element of the initial population representing a group of engine model parameters. Then the initial population is substituted into the engine model to determine a first fitness value of the engine model parameters therein according to the output, then selection, crossover, and mutation operations are performed on the initial population according to the first fitness value, and a to-be-selected population is constituted from the obtained evolved population and initial population. Then the to-be-selected population is substituted into the engine model to determine a second fitness value of the engine model parameters according to and output, and the same number of engine model parameters as the initial population in the to-be-selected population is selected to form a new population according to the second fitness value. If the termination condition is met, the engine model is optimized according to the new population, otherwise the new population replaces the initial population and the process of determining the new population is repeated until the termination condition is met. It is realized that while solving the high-dimensional engine parameter optimization problem, the problems of numerous non-dominated solutions and low selection pressure due to the high dimensionality are avoided, and also the dependence on the reference point set is avoided. There is no need to set parameters not in the algorithm, thus eliminating the need for adjusting a parameter according to prior experiences to deal with different types of problems and making the optimization process simple and general.

DETAILED DESCRIPTION

The present disclosure is described in further detail below with drawings and embodiments. It should be understood that specific embodiments described herein are intended only to explain the present disclosure and are not intended to limit it. It is also to be noted that, for ease of description, the drawings only show a portion, but not all, of the structure relating to the present disclosure.

Before discussing the embodiments in detail, it should be mentioned that some of the embodiments are described as processes or methods depicted as flow charts. Although the flowchart depicts the steps as sequential processing, many of the steps may be implemented in parallel, concurrently, or simultaneously. In addition, the order of the steps may be rearranged. The processing may be terminated when its operation is completed and may also have additional steps not included in the drawings. The processing may correspond to methods, functions, protocols, subroutines, subprogram, etc.

Embodiment 1

Figure 1:
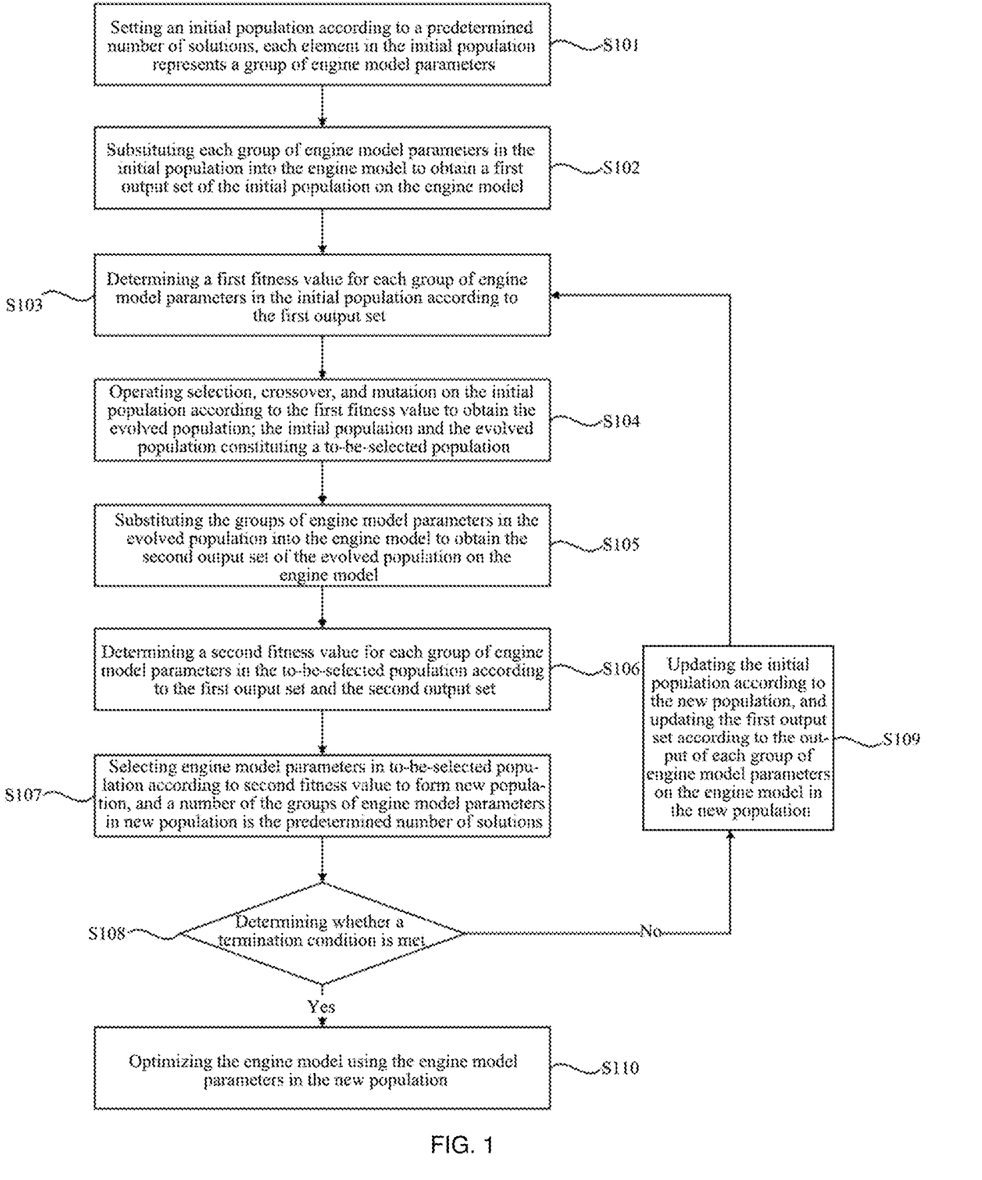
FIG. 1 is a flow chart of the optimization method for engine model provided in embodiment 1 of the present disclosure.

FIG. 1 shows a flow chart of a method for optimizing engine model provided by embodiment 1 of the present disclosure. The present embodiment may be applicable to the optimization of an engine model, and the method may be performed by an optimization apparatus for engine model provided by an embodiment of the present disclosure, which may be implemented by way of hardware and/or software, and may generally be integrated in a computer device. As shown in FIG. 1, the method comprises:

S101, setting an initial population according to a predetermined number of solutions, and each element in the initial population represents a group of engine model parameters.

The predetermined number of solutions can be the number of solutions that the user sets in hopes that are finally obtained, i.e., the number of groups of engine model parameters, and since there are generally multiple subparameters in the engine model parameters, multiple groups of solutions can be obtained to enable the user to select the most suitable engine model parameters according to the solutions and the actual needs, such as the required numerical accuracy and the fabrication process on the hardware. After setting the population according to the predetermined number of solutions, the initial population is obtained by initializing the elements in this population, and each element can represent a group of engine model parameters. The initialization method can be random initialization, specifically a Random Latin Hypercubes method, which can make the optimization method provided by the embodiment of the present disclosure have a certain universality and be applied to various engine models, simplify the optimization process, and also initialize the population according to prior experience and knowledge about corresponding engine model, so as to obtain optimization results faster.

In the present embodiment, population is a set of possible potential solutions of a genetic algorithm for a representative problem, and the population consists of a certain number of genetically encoded individuals. After the initial generation of the population is generated, it can evolve generation by generation to produce increasingly better approximate solutions according to the principles of survival of the fittest. In each generation, individuals can be selected according to the fitness size of individuals in the problem domain, and combinatorial crossover and mutation can be performed with the help of natural genetic operators to produce populations representing new solution sets. This process will lead to populations like natural evolution of later generations that are more adapted to the environment than their predecessors, and the optimal individuals in the last generation populations are decoded, i.e., they can be used as approximate optimal solutions to the problem.

S102, substituting each group of engine model parameters in the initial population into the engine model to obtain a first output set of the initial population on the engine model.

Specifically, all groups of engine model parameters in the initial population are substituted into the engine model separately to obtain corresponding outputs, and all the outputs together constitute the first output set. Among them, the engine model parameters may include power extraction, combustion chamber pressure ratio, mix design Mach number, nozzle thrust coefficient, and nozzle flow coefficient, etc., and the corresponding outputs may include total flow rate, low pressure turbine outlet temperature, low pressure turbine inlet pressure, fan internal outlet pressure, and total pressure ratio, etc. The engine model in the present embodiment can use various engine mathematical models from the prior art, which will not be repeated here.

S103, determining a first fitness value for each group of engine model parameters in the initial population according to the first output set.

The fitness value is the relative ability of an individual of a known genotype to pass its genes to its offspring gene pool under certain environmental conditions and is a measure of the individual's chances of survival and reproduction. The larger the fitness value, the better the quality of the solution. Optionally, determining the first fitness value of each group of engine model parameters in the initial population according to the first output set comprises: determining the target value of each group of engine model parameters in the initial population in each dimension; each dimension corresponds to a different test state and test indicator in the engine model, a number of the dimensions is the product of a number of the test states and a number of the test indicators, the test indicators correspond to each output of the first output set. If the optimization goal of the test indicator is the expected value, the target value of the corresponding test indicator is the error value between the target output of the engine model parameters in the initial population in the corresponding target dimension on the engine model and the expected value of the corresponding target output, the target dimension is the dimension of the corresponding test indicator. If the optimization goal of the test indicator is to reduce as much as possible, the target value of the corresponding test indicators is the normalized value of the target outputs relative to the target output corresponding to each group of engine model parameters in the initial population. If the optimization target of the test indicators is to increase as much as possible, the target value of the corresponding test indicators is the normalized value of the opposite number of the target output relative to the opposite number of the target output corresponding to each group of engine model parameters in the to-be-selected population. According to the target value,
the first fitness value of each group of engine model parameters in the initial population is determined according to the target value.

The optimization method provided in the present embodiment can be used for optimization of multi-target problems, especially multi-target problems arising from different test states and test indicators in the engine model. For an aircraft engine, the test states may include various speeds, altitudes, atmospheric pressures, etc., and for an automobile engine, the test states may include various speeds and atmospheric pressures, etc., and the test indicators may be indicators included in the respective outputs. For example, suppose that in the engine model, h test indicators in k test states need to be optimized, then k*h targets are generated, and we can call the problem in a certain dimension for a certain target, where k and h are positive integers and the dimension is an integer in [1, k*h].

The optimization targets for test indicators can be divided into two types, one is the type where calibration benchmark exists, i.e., the optimization target is to make the value of a test indicator output by the engine model close to the expected value, and the other is the type where no calibration benchmark exists, i.e., the optimization target is to make the value of a test indicator output by the engine model as small or large as possible. For a certain test indicator, all the dimensions corresponding to the test indicator are taken as the target dimensions, and if it is the first type, an error value between a target output of the engine model parameters in the initial population on the engine model corresponding to the target dimension and the expected value corresponding to the target output can be taken as the target value corresponding to the test indicator, and the target value can be calculated by the following formula.

$$f_i(x) = \frac{|\text{output}_i(x) - \text{true}_i(x)|}{\text{true}_i(x)}$$

Where $f_i(x)$ denotes the target value, and $\text{output}_i(x)$ denotes the target output, and $\text{true}_i(x)$ denotes the expected value corresponding to the target output, x are the engine model parameters, and i is the target dimension. If it is the second type, a normalized value of the target output relative to the target output corresponding to each group of engine model parameters in the initial population can be used as the target value corresponding to the test indicators, and the target value can be calculated by the following equation.

$$f_i(x) = \frac{\text{output}_i(x) - \min_{z \in X}(\text{output}_i(z))}{\max_{z \in X}(\text{output}_i(z)) - \min_{z \in X}(\text{output}_i(z))}$$

Where $f_i(x)$ denotes the target value, $\text{output}_i(x)$ denotes the target output, $$\min_{z \in X}(\text{output}_i(z))$$

denotes the minimum value in the target output corresponding to each group of engine model parameters in the initial population, $$\max_{z \in X}(\text{output}_i(z))$$

denotes the maximum value in the target output corresponding to each group of engine model parameters in the initial population, x and z are the engine model parameters, i is the target dimension, and X is the initial population. Specifically, the purpose of normalization is to map the target output to the interval [0,1] so that it has the same magnitude as the error value, and thus jointly serves as the target value. After determining the target value for each case, the first fitness value of each engine model parameter in the initial population can be determined according to the target value, and the first fitness value can be calculated by the following equation.

$$SDE(p, P) = \min_{q \in P, q \neq p} (d(p, q)), d(p, q) = \sqrt{\sum_{i=1}^{m} (\max(p_i, q_i) - p_i)^2}$$

Where $SDE(p,P)$ denotes the first fitness value of p based on P, P is the initial population, p is the engine model parameter in the initial population, q is the engine model parameter in the initial population different from p, $p_i$ is the target value of p in dimension i, $q_i$ is the target value of q in dimension i, i is the dimension, and m is the number of dimensions. The above formula for the calculation of the first fitness value allows us to maintain better convergence and diversity in the process of solving problems with irregular Pareto frontiers in a dynamic evaluation strategy that is adaptive.

S104, operating selection, crossover, and mutation on the initial population according to the first fitness value to obtain the evolved population; the initial population and the evolved population constituting a to-be-selected population.

Among them, the selection operation is used to determine how to select certain individuals from the initial population as parents and then perform a crossover (mating) operation to generate new individuals. In the present embodiment, individuals are the engine model parameters. In the initial population, a more powerful individuals will have a higher probability of generating the next generation, and the probability of being selected can be determined by the fitness value of the individuals. The methods of selection operation can include: roulette selection method, random traversal sampling method, and tournament selection method. In the present embodiment, the binary tournament method is used for selection to obtain better performance, i.e., two individuals are taken from the initial population at a time (put-back sampling), and then the better (i.e., larger fitness value) one of them is selected to enter the offspring population, and the operation is repeated until the size of the offspring population reaches the size of the initial population, where size can refer to the number of individuals in each population, in the present embodiment, which is the number of groups of engine model parameters.

After obtaining a complete population of offspring, crossover and mutation operations can be performed on the offspring population to obtain an evolved population, the initial population and the evolved population are jointly used as the to-be-selected population. The crossover operation, i.e., chromosome crossover operation, is the process of selecting two individuals in the offspring population to mate with each other and exchanging the chromosomes of the two individuals in a certain way to form a new individual, which can be performed by Simulated Binary Crossover (SBX). The new individuals formed after the crossover operation have a certain probability to undergo genetic mutation, and like the selection operation, the mutation operation is prob-ability-based, and optionally, the probability can be an inverse of the group number of the engine model parameters. The mutation operation can be performed by a polynomial mutation method (Polynomial Mutation).

S105, substituting the groups of engine model parameters in the evolved population into the engine model to obtain the second output set of the evolved population on the engine model.

After obtaining the evolved population, each group of engine model parameters in the evolved population can be substituted into the engine model to obtain the corresponding output, and all the outputs together form the second output set.

S106, determining a second fitness value for each group of engine model parameters in the to-be-selected population according to the first output set and the second output set.

After the first output set and the second output set are obtained, the outputs corresponding to all engine model parameters in the to-be-selected population on the engine model are obtained. Optionally, determining the second fitness value of each group of engine model parameters in the to-be-selected population based on the first output set and the second output set, comprises: determining the target value of each group of engine model parameters in the to-be-selected population in each dimension; wherein each dimension corresponds to a different test state and test indicator in the engine model, the number of dimensions is the product of the number of the test states and the number of the test indicators, the test indicators correspond to each outputs in the first output set and the second output set. If the optimization target of the test indicator is the expected value, the target value of the corresponding test indicator is an error value between the target output of the engine model parameters in the engine model of the to-be-selected population on the corresponding target dimension and the expected value of the corresponding target output, and the target dimension is the dimension of the corresponding test indicator. If the optimization goal of the test indicators is to reduce as much as possible, the target value of the corresponding test indicators is a normalized value of the target output relative to the target output corresponding to each group of engine model parameters in the to-be-selected population. If the optimization goal of the test indicators is to increase as much as possible, the target value of the corresponding test indicators is a normalized value of an opposite number of the target output relative to an opposite number of the target output corresponding to each group of engine model parameters in the to-be-selected population. According to the target value, the second fitness value of each group of engine model parameters in the to-be-selected population is determined.

Optionally, the target value corresponding to the test indicator is the error value between the target output of the engine model parameters in the to-be-selected population on the engine model corresponding to the target dimension and the expected value of the corresponding target output, and the target dimension is the dimension corresponding to the test indicator, comprising:

$$f_i(x) = \frac{|output_i(x) - true_i(x)|}{true_i(x)}$$

Where $f_i(x)$ denotes the target value, $output_i(x)$ denotes the target output, $true_i(x)$ denotes the expected value corresponding to the target output, x are the engine model parameters, and i is the target dimension.

Optionally, the target value corresponding to the test indicator is a normalized value of the target output relative to the target output corresponding to each group of engine model parameters in the to-be-selected population, comprising:

$$f_i(x) = \frac{\text{output}_i(x) - \min_{z \in X}(\text{output}_i(z))}{\max_{z \in X}(\text{output}_i(z)) - \min_{z \in X}(\text{output}_i(z))}$$

where $f_i(x)$ denotes the target value, $\text{output}_i(x)$ denotes the target output, $$\min_{z \in X}\left(\text{output}_i(z)\right)$$

denotes the minimum value of the target output corresponding to each group of engine model parameters in the to-be-selected population, $$\max_{z \in X}(\text{output}_i(z))$$

denotes the maximum value of the target output corresponding to each group of engine model parameters in the to-be-selected population, x and z are the engine model parameters, i is the target dimension, and X is the to-be-selected population.

Optionally, a second fitness value for each group of engine model parameters in the to-be-selected population is determined based on the target value, comprising:

$$SDE(p, P) = \min_{q \in P, q \neq p}(d(p, q)), d(p, q) = \sqrt{\sum_{k=1}^{m}(\max(p_i, q_i) - p_i)^2}$$

Where SDE(p, P) denotes the second fitness value of p based on P, P is the to-be-selected population, p is the engine model parameter in the to-be-selected population, q is the engine model parameter in the to-be-selected population that is different from p, $p_i$ is the target value of p in dimension i, $q_i$ is the target value in dimension i, i is the dimension, and m is the number of dimensions.

The specific process of determining the second fitness value can be referred to the process of determining the first fitness value above, which will not be repeated here.

S107, selecting the engine model parameters in the to-be-selected population according to the second fitness value to form a new population, and a number of the groups of engine model parameters in the new population is the predetermined number of solutions.

Figure 2:
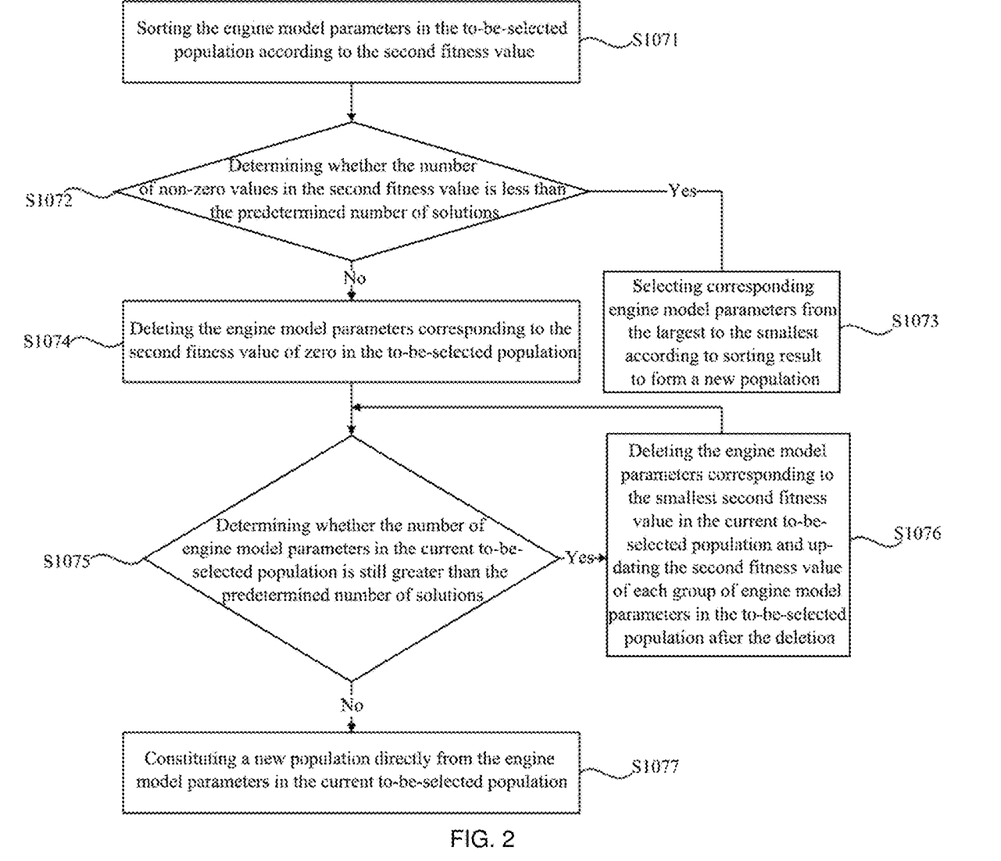
FIG. 2 is a flow chart of the process of selecting engine model parameters in the to-be-selected population to form a new population according to the second fitness value provided in embodiment 1 of the present disclosure.

N groups of engine model parameters with a better second fitness value may be selected in the to-be-selected population to form a new population, wherein the value of N is the number of groups of engine model parameters in the initial population, i.e., a predetermined number of solutions. Optionally, selecting the engine model parameters in the to-be-selected population according to the second fitness value to form the new population, and the number of groups of engine model parameters in the new population is the predetermined number of solutions, comprising: sorting the engine model parameters in the to-be-selected population according to the second fitness value; if the number of non-zero values of the second fitness value is less than the predetermined number of solutions, selecting the corresponding engine model parameters according to the sorting result from the largest to the smallest to form the new population. If the number of non-zero values in the second fitness value is greater than or equal to the current number of solutions, then execute step (i) deleting the engine model parameters corresponding to the second fitness value of zero in the to-be-selected population. Step (j): if the number of engine model parameters in the current to-be-selected population is still greater than the predetermined number of solutions, then executing step (k), otherwise the engine model parameters in the current to-be-selected population directly form the new population. Step (k): deleting the engine model parameters corresponding to the smallest the second fitness value in the current to-be-selected population, updating the second fitness value for each group of engine model parameters in to-be-selected population after deletion, and returning to execute step (j). Accordingly, as shown in FIG. 2, it may include the following steps:

S1071, sorting the engine model parameters in the to-be-selected population according to the second fitness value.

Multiple values of the second fitness values may be the same, then the generated d(p, q) in the process of determining the second fitness values for each group of engine model parameters in the to-be-selected population as described above can be stored. This can be done by storing them in vector form after sorting them in order from smallest to largest. When comparing the second fitness values of the two groups of engine model parameters, if the values are the same, a second value of the respective corresponding vector can be compared. if the second value is also the same, a third value of the respective corresponding vector can be compared, and so on until a different value appears, and if all are the same, the two groups of engine model parameters can be randomly sorted. Then all the engine model parameters in the to-be-selected population can be sorted according to the above method, and then the higher quality engine model parameters can be accurately determined.

S1072, determining whether the number of non-zero values in the second fitness value is less than the predetermined number of solutions, if yes, executing S1073; if not, executing S1074.

S1073, selecting corresponding engine model parameters from the largest to the smallest according to the sorting result to form a new population.

If the number of non-zero values of the second fitness value is less than the number of predetermined solutions, the N groups of engine model parameters with the larger second fitness value are selected directly according to the above sorting result, where the value of N is the number of the groups of engine model parameters in the initial population, i.e., the number of predetermined solutions, so that the engine model parameters with higher quality and the same number of the groups as the engine model parameters in the initial population are selected from the to-be-selected population to form a new population.

S1074, deleting the engine model parameters corresponding to the second fitness value of zero in the to-be-selected population.

If the number of non-zero values in the second fitness value is greater than or equal to the predetermined number of solutions, the engine model parameters corresponding to the second fitness value of zero in the to-be-selected population are deleted first, so that the respective second fitness values can be redetermined among the remaining engine model parameters, thereby excluding the engine model parameters with poor quality and improving the accuracy of the redetermined second fitness values in characterizing the quality of each engine model parameter.

S1075, determining whether the number of engine model parameters in the current to-be-selected population is still greater than the predetermined number of solutions, if yes, executing S1076; if not, executing S1077.

S1076, deleting the engine model parameters corresponding to the smallest second fitness value in the current to-be-selected population and updating the second fitness value of each group of engine model parameters in the to-be-selected population after the deletion, then returning to execute S1075.

If the number of engine model parameters in the to-be-selected population after deleting the engine model parameters corresponding to the second fitness value of zero is still larger than the predetermined number of solutions, the engine model parameters with the smallest current second fitness value can be deleted first, and the respective second fitness values can be recalculated according to the engine model parameters in the to-be-selected population after the deletion, so as to improve the accuracy of quality comparison among the remaining engine model parameters, thus facilitating the redetermination of the engine model parameter with the smallest second fitness value in the current to-be-selected population. The process of quantity determination is then returned to determine whether the new population to be determined has been obtained.

Optionally, determining the second fitness value for each group of engine model parameters in the to-be-selected population according to the target value, further comprises: setting a d(p, p) value as a special value that cannot participate in the comparison; storing the d(p,p) and generated d(p, q) in the process of determining the second fitness value as a density estimation matrix; accordingly, delete the engine model parameter corresponding to the smallest second fitness value in the current to-be-selected population, and update the second fitness value of each group of engine model parameters in the to-be-selected population after the deletion, comprising: setting the values in the rows and columns of the density estimation matrix corresponding to the engine model parameters with the smallest value of the second fitness as the special values; updating the second fitness value of each group of engine model parameters in the to-be-selected population after deletion according to the density estimation matrix having been set.

In the calculating d(p, q) process, d(p, q) between each group of engine model parameters p in the to-be-selected population and the other engine model parameters is calculated, and in order to facilitate storing d(p, q) as a density estimation matrix, the d(p,p) value could be set as a special value that cannot participate in the comparison. Optionally, the special value is infinite "∞", then if d(p,p) and d(p, q) for a certain group of engine model parameters p are sorted from smallest to largest, then d(p, p) will be at the bottom and have no effect on the process of the second fitness value in the selection of the minimum value of the d(p, q). The density estimation matrix can be stored by row for each group of engine model parameters.

After storing the density estimation matrix, each row can be sorted and the second fitness value corresponding to each group of engine model parameters can be determined according to the sorting result, so that the engine model parameters with the smallest current second fitness value can be determined according to the sorted density estimation matrix. When it is necessary to delete them, the rows and columns in the density estimation matrix before sorting can also be set as special values, so that they are no longer involved in the comparison, and they are deleted in the meaning. When it is necessary to update the second fitness value of each group of engine model parameters in the to-be-selected population after deletion, it is only necessary to resort each row of the remaining part of the density estimation matrix to determine again the second fitness value corresponding to each group of engine model parameters and the engine model parameter with the smallest current second fitness value. By setting the density estimation matrix, in the process of recalculating the second fitness values of each group of engine model parameters in the current to-be-selected population, it is no longer necessary to repeatedly calculate the corresponding d(p, q), thus a large amount of computational resources are saved and the optimization efficiency is improved.

S1077, constituting a new population directly from the engine model parameters in the current to-be-selected population.

S108, determining whether a termination condition is met, If no, executing S109; if yes, executing S110.

The termination condition can be that the optimization time, computational power, or optimization results that are set by users achieve a predetermined accuracy.

S109, updating the initial population according to the new population, and updating the first output set according to the output of each group of engine model parameters on the engine model in the new population, and returning to perform S103.

If the termination condition is not met, the iterative process of the above population can be repeated, i.e., the new population generated is used as the initial population described above, and the process of determining the new population is repeated with the output of each group of engine model parameters in the new population on the engine model as the first output set described above, in order to continuously generate new populations of better quality.

S110, optimizing the engine model using the engine model parameters in the new population.

If the termination condition is met, the engine model parameters in the obtained new population can be used as the final optimized engine model parameters, and stored in the engine model to achieve optimization of the engine model.

In the technical solution provided by the embodiment of the present disclosure, first, an initial population is set according to a predetermined number of solutions. Each element of the initial population represents a group of engine model parameters. Then the initial population is substituted into the engine model to determine a first fitness value of the engine model parameters therein according to the output, then the initial population is selected, crossed and mutated according to the first fitness value, and the evolved population obtained together with the initial population form a to-be-selected population. Then the to-be-selected population is substituted into the engine model to determine a second fitness value of the engine model parameters therein according to the output, and selecting the same number of engine model parameters as the initial population in the to-be-selected population to form a new population according to the second fitness value If the termination condition is met, the engine model is optimized according to the new population, otherwise the new population replaces the initial population. The process of determining the new population is repeated until the termination condition is met. It is realized that while solving the high-dimensional optimization problem of the engine parameters, the problems of numerous non-dominated solutions and low selection pressure due to the high dimensionality are avoided, and also the dependence on the reference point sets is avoided, parameters other than those in the algorithm are not required, thus there is no need for adjusting parameters according to prior experiences to deal with different types of problems and making the optimization process simple and general.

Embodiment 2

Figure 3:
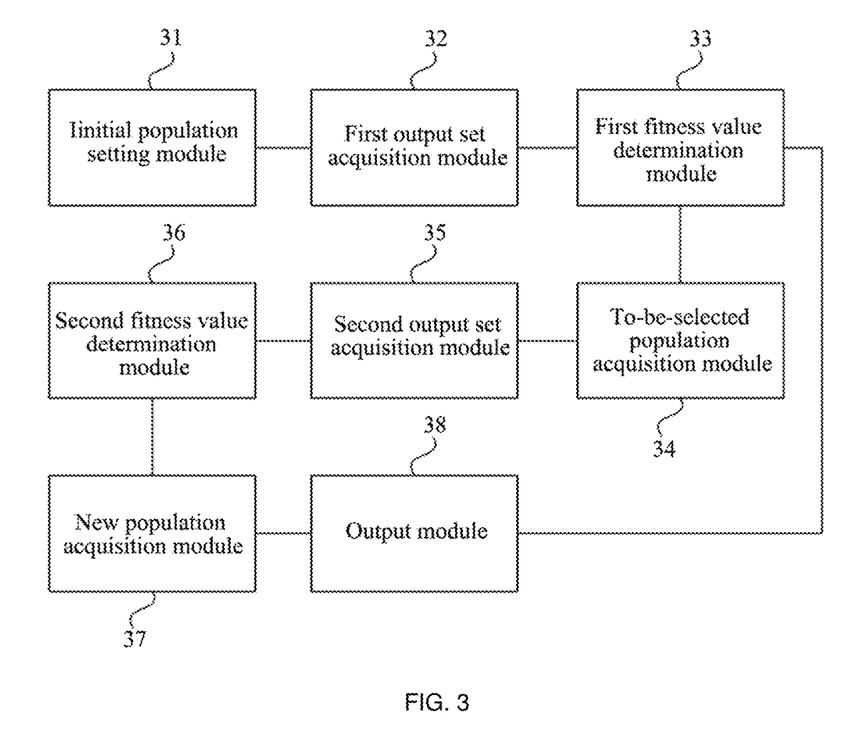
FIG. 3 is a schematic diagram of the structure of the optimization apparatus for the engine model provided in embodiment 2 of the present disclosure.

FIG. 3 shows a schematic diagram of the structure of an optimization apparatus for an engine model provided in embodiment 2 of the present disclosure, which can be implemented by means of hardware and/or software and can generally be integrated in a computer device. As shown in FIG. 3, the apparatus comprises:

an initial population setting module 31 for setting an initial population according to a predetermined number of solutions, each element in the initial population representing a group of engine model parameters;

a first output set acquisition module 32 for substituting groups of engine model parameters in the initial population into the engine model to obtain a first output set of the initial population on the engine model;

a first fitness value determination module 33 for determining a first fitness value for each group of engine model parameters in the initial population according to the first output set;

a to-be-selected population acquisition module 34 for selecting, crossover and mutating the initial population according to the first fitness value to obtain an evolved population; the initial population and the evolved population constitute the to-be-selected population;

a second output set acquisition module 35 for substituting each group of engine model parameters in the evolved population into the engine model to obtain a second output set of the evolved population on the engine model;

a second fitness value determination module 36 for determining a second fitness value for each group of engine model parameters in the to-be-selected population according to the first output set and the second output set;

a new population acquisition module 37 for selecting engine model parameters in the to-be-selected population to form a new population according to the second fitness value, the number of groups of engine model parameters in the new population being a predetermined number of solutions;

an output module 38 for updating the initial population according to the new population if the termination condition is not met, as well as updating the first output set according to the output of each group of engine model parameters on the engine model in the new population and returning to the first fitness value determination module 33 for continued execution; if the termination condition is met, the engine model is optimized using the engine model parameters in the new population.

In the technical solution provided by the embodiment of the present disclosure, first, an initial population is set according to a predetermined number of solutions. Each element of the initial population represents a group of engine model parameters. Then the initial population is substituted into the engine model to determine a first fitness value of the engine model parameters therein according to the output, then the initial population is selected, crossed and mutated according to the first fitness value, and the evolved population obtained together with the initial population form a to-be-selected population. Then the to-be-selected population is substituted into the engine model to determine a second fitness value of the engine model parameters therein according to the output, and selecting the same number of engine model parameters as the initial population in the to-be-selected population to form a new population according to the second fitness value. If the termination condition is met, the engine model is optimized according to the new population, otherwise the new population replaces the initial population. The process of determining the new population is repeated until the termination condition is met. It is realized that while solving the high-dimensional optimization problem of the engine parameter, the problems of numerous non-dominated solutions and low selection pressure due to the high dimensionality are avoided, and the dependence on the reference point sets is also avoided, no parameters other than those in the algorithm are needed, thus there is no need for adjusting parameters according to prior experiences to deal with different types of problems and making the optimization process more simple and general.

Optionally, based on the above technical solution, the new population acquisition module 37 comprises:

a sorting unit for sorting the engine model parameters in the to-be-selected population according to a second fitness value;

a first new population constitution unit for selecting the corresponding engine model parameters to form a new population according to the sorting result from largest to smallest if the number of non-zero values of the second fitness value is less than the predetermined number of solutions;

a parameter deletion unit for deleting the engine model parameters corresponding to the second fitness value of zero in the to-be-selected population if the number of non-zero values of the second fitness value is greater than or equal to the predetermined number of solutions;

a second new population constitution unit for continuing the execution of the parameter deletion unit if the number of engine model parameters in the current to-be-selected population is still greater than the predetermined number of solutions, otherwise the new population is directly constituted from the engine model parameters in the current to-be-selected population;

a fitness value update unit for deleting the engine model parameters corresponding to the smallest second fitness value in the current to-be-selected population, updating the second fitness value of each group of engine model parameters in the selected population after the deletion, and returning to the second new population constitution unit for further execution.

Optionally, based on the above technical solution, the second fitness value determination module 36 comprises:

a target value determination unit for determining the target value for each group of engine model parameters in the to-be-selected population in each dimension; wherein each dimension corresponds to a different test state and test indicator in the engine model, the number of dimensions being the product of the number of test states and the number of test indicators, the test indicators corresponding to each outputs in the first output set and the second output set; if the optimization target of the test indicators is the expected value, the target value corresponding to the test indicator is the error value between the target output of the engine model parameters in the to-be-selected population in the corresponding target dimension on the engine model and the expected value of the corresponding target output, the target dimension is the dimension of the corresponding test indicator. If the optimization target of the test indicator is to reduce as much as possible, the target value of the corresponding test indicator is a normalized value of the target output relative to the target output corresponding to each group of engine model parameters in the selected population. If the optimization target of the test indicator is to increase as much as possible, the target value of the corresponding test indicators is a normalized value of an opposite number of the target output relative to an opposite number of the target output corresponding to each group of engine model parameters in the to-be-selected population;

a second fitness value determination unit for determining a second fitness value for each group of engine model parameters in the to-be-selected population according to the target value.

On the basis of the above technical solution, optionally, the target value determination unit is specifically used for:

$$f_i(x) = \frac{|output_i(x) - true_i(x)|}{true_i(x)}$$

where $f_i(x)$ denotes the target value, $output_i(x)$ denotes the target output, $true_i(x)$ denotes the expected value corresponding to the target output, x is the engine model parameter, and i is the target dimension.

On the basis of the above technical solution, optionally, the target value determination unit is specifically used for:

$$f_i(x) = \frac{output_i(x) - \min_{z \in X}(output_i(z))}{\max_{z \in X}(output_i(z)) - \min_{z \in X}(output_i(z))}$$

where $f_i(x)$ denotes the target value, $output_i(x)$ denotes the target output, $$\min_{z \in X}\left(output_i(z)\right)$$

denotes the minimum value of the target output corresponding to each group of engine model parameters in the to-be-selected population, $$\max_{z \in X}\left(output_i(z)\right)$$

denotes the maximum value of the target output corresponding to each group of engine model parameters in the to-be-selected population, x and z are the engine model parameters, i is the target dimension, and X is the to-be-selected population.

On the basis of the above technical solution, optionally, the second fitness value determination unit is specifically used for:

$$SDE(p, P) = \min_{q \in P, q \neq p}(d(p, q)), \quad d(p, q) = \sqrt{\sum_{i=1}^{m}(\max(p_i, q_i) - p_i)^2}$$

Where SDE(p,P) denotes the second fitness value of p based on P, P is the to-be-selected population, p is the engine model parameter in the to-be-selected population, q is the engine model parameter in the to-be-selected population that is different from p, $p_i$ is the target value of p in dimension i, $q_i$ is the target value in dimension i, i is the dimension, and m is the number of dimensions.

Optionally, on the basis of the above technical solution, the second fitness value determination unit comprises:

a first special value setting subunit for setting the d(p, p) value as a special value that cannot participate in the comparison;

a density estimation matrix storage subunit for storing the d(p,p) and generated d(p, q) in the process of determining the second fitness value as a density estimation matrix.

Correspondingly, the fitness value update unit comprises:

a second special value setting subunit for setting values in rows and columns of the density estimation matrix corresponding to the engine model parameters with the smallest value of the second fitness as the special values;

a fitness value update subunit for updating the second fitness value of each group of engine model parameters in the to-be-selected population after deletion according to the density estimation matrix having been set.

The optimization apparatus of the engine model provided in the embodiment of the present disclosure can execute the optimization method for engine model provided in any embodiment of the present disclosure, having the functional modules and beneficial effects corresponding to the execution method.

It is worth noting that in the above embodiment of the engine model optimization apparatus, the various units and modules included are only divided according to the functional logic, but are not limited to the above division, as long as they can achieve the corresponding functions; moreover, the specific names of individual functional units are only for the purpose of mutual differentiation and are not used to limit the scope of protection of the present disclosure.

Embodiment 3

Figure 4:
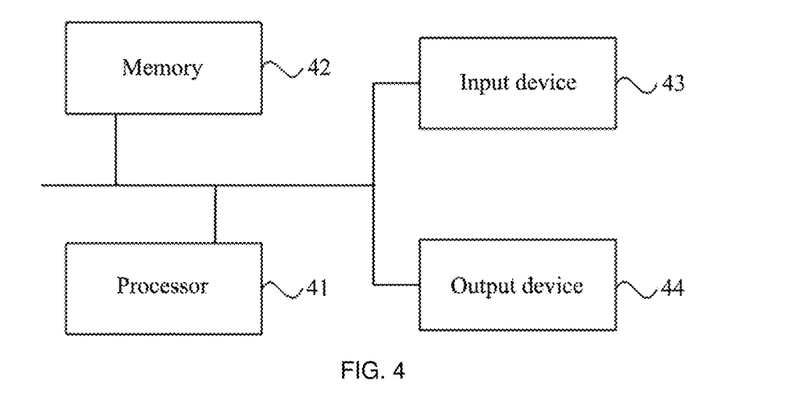
FIG. 4 is a schematic diagram of the structure of the computer device provided in embodiment 3 of the present disclosure.

FIG. 4 is a schematic diagram of the structure of the computer device provided in embodiment 3 of the present disclosure, showing a block diagram of an exemplary computer device suitable for implementing embodiments of the present disclosure. The computer device shown in FIG. 4 is only an example and should not impose any limitations on the functionality and scope of use of embodiments of the present disclosure. As shown in FIG. 4, the computer device includes a processor 41, a memory 42, an input device 43, and an output device 44. The number of the processors 41 in the computer device may be one or more, and one processor 41 is used as an example in FIG. 4. The processor 41, memory 42, input device 43, and output device 44 in the computer device may be connected via a bus or other means, and FIG. 4 shows the connection via bus connection as an example.

The memory 42, as a computer-readable storage medium, can be used to store software programs, computer-executable programs, and modules, such as program instructions/modules corresponding to the optimization method for engine model in the embodiment of the present disclosure (e.g., an initial population setting module 31, a first output set acquisition module 32, a first fitness value determination module 33, a to-be-selected population acquisition module 34, a second output set acquisition module 35, a second fitness value determination module 36, a new population acquisition module 37, and an output module 38 in the optimization apparatus of the engine model). The processor 41 performs various functional applications of the computer device and data processing by running the software programs, instructions, and modules stored in the memory 42, i.e., realizing the optimization method for engine model described above.

The memory 42 may primarily comprise a stored program area and a stored data area, wherein the stored program area may store the operating system and the application programs required for at least one function; the stored data area may store data created according to the use of the computer device. In addition, the memory 42 may include high-speed random access memory, and may also include non-volatile memory, such as at least one disk memory device, flash memory device, or other non-volatile solid state memory device. In some embodiments, the memory 42 may further include memory that is remotely located relative to the processor 41, and these remote memories may be connected to the computer device via a network. Examples of the networks include, but are not limited to, the Internet, corporate intranets, local area networks, mobile communication networks, and combinations thereof.

The input device 43 may be used to receive a predetermined number of solutions set by the user, and to generate key signal inputs related to user settings and function control of the computer device, etc. The output device 44 may be used to output an optimized engine model.

Embodiment 4

Embodiment 4 of the present disclosure also provides a storage medium comprising computer-executable instructions, the computer-executable instructions are, when executed by a computer processor, for performing a method for optimizing an engine model, the method comprising:

(a) setting up an initial population according to a predetermined number of solutions, each element in the initial population representing a group of engine model parameters.

(b) substituting each group of engine model parameters from the initial population into the engine model to obtain a first output set of the initial population on the engine model.

(c) determining a first fitness value for each group of engine model parameters in the initial population according to the first output set.

(d) operating selection, crossover and mutation on the initial population according to the first fitness value to obtain an evolved population; the initial population and the evolved population constituting a to-be-selected population.

(e) substituting each group of engine model parameters in the evolved population into the engine model to obtain a second output set of the evolved population on the engine model.

(f) determining a second fitness value of each group of engine model parameters in the to-be-selected population according to the first output set and the second output set.

(g) selecting engine model parameters in the to-be-selected population to form a new population according to the second fitness value, a number of the groups of engine model parameters in the new population being the predetermined number of solutions.

(h) if a termination condition is not met, updating the initial population according to the new population, and updating the first output set according to an output of each group of engine model parameters on the engine model in the new population, and returning to execute step (c); if the termination condition is met, optimizing the engine model using the engine model parameters in the new population.

The storage media may be various types of memory devices or storage devices. The term "storage media" is intended to include: mounting media, such as CD-ROM, floppy disk or tape device; computer system memory or random access memory, such as DRAM, DDR RAM, SRAM, EDO RAM, Rambus RAM, etc.; non-volatile memory, such as flash memory, magnetic media (e.g., hard disk or optical storage); registers or other similar types of memory elements, etc. The storage media may also include other types of memory or combinations thereof. Optionally, the storage medium may be located in the computer system in which the program is executed or may be located in a different second computer system, which is connected to the computer system via a network (such as the Internet). The second computer system may provide program instructions to the computer for execution. The term "storage media" may include two or more storage media that may reside in different locations (e.g., in different computer systems connected via a network). The storage media may store program instructions (e.g., specifically implemented as a computer program) that may be executed by one or more processors.

Of course, a storage medium comprising computer-executable instructions provided by the embodiment of the present disclosure has computer-executable instructions that are not limited to the method operations as described above, but can also perform the relevant operations in the optimization method for engine model provided by any embodiment of the present disclosure.

The computer-readable signal medium may include a data signal propagated in the baseband or as part of a carrier wave that carries computer-readable program code. This propagated data signal can take a variety of forms, including but not limited to electromagnetic signals, optical signals, or any suitable combination of the above. The computer-readable signal medium may also be any computer-readable medium other than a computer-readable storage medium that sends, propagates, or transmits a program for use by or in conjunction with an instruction execution system, apparatus, or device.

The program code contained on the computer-readable medium may be transmitted using any suitable medium, including but not limited to wireless, wire, fiber optic cable, RF, etc., or any suitable combination of the above.

From the above description of the embodiments, it will be clear to those skilled in the field that the present disclosure can be implemented with the aid of software and the necessary commodity hardware, or of course by hardware, but in many cases the former is the better embodiment. Based on this understanding, the technical solution of the present disclosure, which essentially or rather contributes to the prior art, can be embodied in the form of a software product, which can be stored in a computer readable storage medium, such as a computer floppy disk, Read-Only Memory (ROM), Random Access Memory (RAM), FLASH, hard disk or CD-ROM, etc., including a number of instructions to make a computer device (which may be a personal computer, a server, or a network device, etc.) perform the method described in various embodiments of the present disclosure.

It should be noted that the foregoing description is only for an embodiment of the present disclosure and the technical principles employed. It will be understood by those skilled in the art that the present disclosure is not limited to the particular embodiments described herein, other variations, readjustments and substitutions can be made by those skilled in the art without departing from the scope of protection of the present disclosure. Thus, although the present disclosure is described in some detail by the above embodiments, the present disclosure is not limited to the above embodiments, and may include more other equivalent embodiments without departing from the conception of the present disclosure, the scope of which is determined by the scope of the appended claims.

What is claimed is:

1. An optimization method for engine model, comprising:
   (a) setting an initial population according to a predetermined number of solutions, each element in the initial population representing a group of engine model parameters;
   (b) substituting each group of engine model parameters in the initial population into the engine model to obtain a first output set of the initial population on the engine model;
   (c) determining a first fitness value for each group of engine model parameters in the initial population according to the first output set;
   (d) operating selection, crossover and mutation on the initial population according to the first fitness value to obtain an evolved population; the initial population and the evolved population constituting a to-be-selected population;
   (e) substituting each group of engine model parameters in the evolved population into the engine model to obtain a second output set of the evolved population on the engine model;
   (f) determining a second fitness value for each group of engine model parameters in the to-be-selected population according to the first output set and the second output set;
   (g) selecting engine model parameters in the to-be-selected population to form a new population according to the second fitness value, a number of the groups of engine model parameters in the new population being the predetermined number of solutions;
   (h) if a termination condition is not met, updating the initial population according to the new population, as well as updating the first output set according to an output of each group of engine model parameters in the new population on the engine model, and returning to execution step (c);
   if the termination condition is met, optimizing the engine model by using the engine model parameters in the new population;
   wherein selecting the engine model parameters in the to-be-selected population to form the new population according to the second fitness value, the new population having a group of engine model parameters of the predetermined number of solutions, comprises:
      sorting the engine model parameters in the to-be-selected population according to the second fitness value;
      if a number of non-zero values of the second fitness value is less than the predetermined number of solutions, selecting corresponding engine model parameters in descending order of sorting results to form the new population;
      if the number of non-zero values of the second fitness value is greater than or equal to the predetermined number of solutions, then executing:
         (i) deleting the engine model parameters corresponding to the second fitness value of zero in the to-be-selected population;
         (j) if the number of engine model parameters in current to-be-selected population is still greater than the predetermined number of solutions, then executing step (k), otherwise the engine model parameters in the current to-be-selected population directly form the new population;
         (k) deleting the engine model parameters corresponding to a smallest second fitness value in the current to-be-selected population, and updating the second fitness value for each group of engine model parameters in the to-be-selected population after deletion, and returning to executing step (j).

2. The optimization method for engine model according to claim 1, wherein determining the second fitness value for each group of engine model parameters in the to-be-selected population according to the first output set and the second output set, comprises:
   determining a target value for each group of engine model parameters in the to-be-selected population in each dimension; each dimension corresponds to a different test state and test indicator in the engine model, a number of the dimensions is a product of a number of the test states and a number of the test indicators, the test indicators correspond to each outputs in the first output set and the second output set; if an optimization target of the test indicators is an expected value, then the target value corresponding to the test indicator is an error value between a target output of the engine model parameters in the to-be-selected population corresponding to a target dimension on the engine model and the expected value corresponding to the target output, the target dimension is the dimension corresponding to the test indicator; if the optimization target of the test indicator is to reduce as much as possible, the target value corresponding to the test indicator is a normalized value of the target output relative to the target output corresponding to each group of engine model parameters in the to-be-selected population; if the optimization target of the test indicator is to increase as much as possible, the target value corresponding to the test indicator is a normalized value of an opposite number of the target output relative to an opposite number of the target output corresponding to each group of engine model parameters in the to-be-selected population; if the optimization target of the test indicator is to increase as much as possible, then the target value corresponding to the test indicator is a normalized value of an opposite number of the target output relative to an opposite number of the target output corresponding to each group of engine model parameters in the to-be-selected population;
   determining the second fitness value for each group of engine model parameters in the to-be-selected population according to the target value.

3. The optimization method for engine model according to claim 2, wherein the target value corresponding to the test indicator is the error value between the target output of the engine model parameters in the to-be-selected population on the engine model corresponding to the target dimension and the expected value corresponding to the target output, the target dimension being the dimension corresponding to the test indicator, comprises:

$$f_i(x) = \frac{|output_i(x) - true_i(x)|}{true_i(x)}$$

where $f_i(x)$ denotes the target value, $output_i(x)$ denotes the target output, $true_i(x)$ denotes the expected value corresponding to the target output, x is the engine model parameter, and i is the target dimension.

4. The optimization method for engine model according to claim 2, wherein the target value corresponding to the test indicator the target value is a normalized value of the target output relative to the target output corresponding to each group of engine model parameters in the to-be-selected population, comprises:

$$f_i(x) = \frac{\text{output}_i(x) - \min_{z \in X}(\text{output}_i(z))}{\max_{z \in X}(\text{output}_i(z)) - \min_{z \in X}(\text{output}_i(z))}$$

where $f_i(x)$ denotes the target value, $\text{output}_i(x)$ denotes the target output, $$\min_{z \in X}(\text{output}_i(z))$$

denotes the minimum value in the target output corresponding to each group of engine model parameters in the to-be-selected population, $$\max_{z \in X}(\text{output}_i(z))$$

denotes the maximum value of the target output corresponding to each group of engine model parameters in the to-be-selected population, x and z are the engine model parameters, i is the target dimension, and X is the to-be-selected population.

5. The optimization method for engine model according to claim 2, wherein determining the second fitness value for each group of engine model parameters in the to-be-selected population based on the target value, comprises:

$$SDE(p, P) = \min_{q \in P, q \neq p}(d(p, q)), d(p, q) = \sqrt{\sum_{i=1}^{m}(\max(p_i, q_i) - p_i)^2}$$

where SDE(p, P) denotes the second fitness value of p based on P, P is the to-be-selected population, p is the engine model parameter in the to-be-selected population, q is the engine model parameter in the to-be-selected population that is different from p, $p_i$ is the target value of p in dimension i, $q_i$ is the target value in dimension i, i is the dimension, and m is the number of dimensions.

6. The optimization method for engine model according to claim 5, wherein determining the second fitness value for each group of engine model parameters in the to-be-selected population based on the target value, further comprises:
setting the d(p,p) value as a special value that cannot participate in the comparison;
storing the d(p,p) and the d(p,q) generated in the process of determining the second fitness value as a density estimation matrix;
correspondingly, deleting the engine model parameters corresponding to the smallest the second fitness value in current the to-be-selected population, and updating the second fitness value of each group of engine model parameters in the to-be-selected population after deletion, comprising:

setting values in rows and columns of the density estimation matrix corresponding to the engine model parameters with the smallest value of the second fitness as the special values;
updating the second fitness values for each group of engine model parameters in the to-be-selected population after deletion according to the density estimation matrix having been set.

7. An optimization apparatus for engine model, comprising:
an initial population setting module, configured to set an initial population according to a predetermined number of solutions, each element in the initial population representing a group of engine model parameters;
a first output set acquisition module, configured to substitute each group of engine model parameters in the initial population into the engine model to obtain a first output set of the initial population on the engine model;
a first fitness value determination module, configured to determine a first fitness value for each group of engine model parameters in the initial population according to the first output set;
a to-be-selected population acquisition module, configured to operate selection, crossover and mutation on the initial population according to the first fitness value in order to obtain an evolved population; the initial population and the evolved population constitute a to-be-selected population;
a second output set acquisition module, configured to substitute each group of engine model parameters in the evolved population into the engine model to obtain a second output set of the evolved population on the engine model;
a second fitness value determination module, configured to determine a second fitness value for each group of engine model parameters in the to-be-selected population according to the first output set and the second output set;
a new population acquisition module, configured to select engine model parameters in the to-be-selected population to form a new population according to the second fitness value, a number of groups of engine model parameters in the new population being the predetermined number of solutions; and
an output module, configured to update the initial population according to the new population if a termination condition is not met, and to update the first output set according to the output of each group of engine model parameters in the new population on the engine model and return to the first fitness value determination module for continued execution; if the termination condition is met, then to optimize the engine model by using the engine model parameters in the new population;
wherein selecting the engine model parameters in the to-be-selected population to form the new population according to the second fitness value, the new population having a group of engine model parameters of the predetermined number of solutions, comprises:
sorting the engine model parameters in the to-be-selected population according to the second fitness value;
if a number of non-zero values of the second fitness value is less than the predetermined number of solutions, selecting corresponding engine model parameters in descending order of sorting results to form the new population;

if the number of non-zero values of the second fitness value is greater than or equal to the predetermined number of solutions, then executing:
- (i) deleting the engine model parameters corresponding to the second fitness value of zero in the to-be-selected population;
- (j) if the number of engine model parameters in current to-be-selected population is still greater than the predetermined number of solutions, then executing step (k), otherwise the engine model parameters in the current to-be-selected population directly form the new population;
- (k) deleting the engine model parameters corresponding to a smallest second fitness value in the current to-be-selected population, and updating the second fitness value for each group of engine model parameters in the to-be-selected population after deletion, and returning to executing step (j).

8. A computer device, comprising:
one or more processors;
a memory for storing one or more programs;
when the one or more programs are executed by the one or more processors such that the one or more processors implement the optimization method for engine model according to claim 1.

9. A non-transitory computer readable storage medium having a computer program stored thereon, wherein the program, when executed by a processor, implements the optimization method for engine model according to claim 1.

* * * * *